(12) United States Patent
Wilson

(10) Patent No.: US 8,328,543 B2
(45) Date of Patent: Dec. 11, 2012

(54) CONTOURED CHECK VALVE DISC AND SCROLL COMPRESSOR INCORPORATING SAME

(75) Inventor: Francis P. Wilson, Jamesville, NY (US)

(73) Assignee: Bitzer Kuehlmaschinenbau GmbH, Sindelfingen (DE)

( * ) Notice: Subject to any disclaimer, the term of this patent is extended or adjusted under 35 U.S.C. 154(b) by 918 days.

(21) Appl. No.: 12/418,326

(22) Filed: Apr. 3, 2009

(65) Prior Publication Data
US 2010/0254842 A1   Oct. 7, 2010

(51) Int. Cl.
F04C 2/00 (2006.01)
F04C 2/063 (2006.01)
F16K 15/00 (2006.01)
F16K 21/00 (2006.01)

(52) U.S. Cl. .................................. 418/55.1; 137/533.19
(58) Field of Classification Search .................. 418/55.1; 137/533.19
See application file for complete search history.

(56) References Cited

U.S. PATENT DOCUMENTS

| | | | |
|---|---|---|---|
| 2,754,844 A * | 7/1956 | Blackford | 137/514 |
| 3,626,977 A * | 12/1971 | Riley et al. | 137/516.25 |
| 3,889,710 A | 6/1975 | Brost | |
| 4,655,696 A | 4/1987 | Utter | |
| 4,696,630 A | 9/1987 | Sakata et al. | |
| 4,927,339 A | 5/1990 | Riffe et al. | |
| 5,090,878 A | 2/1992 | Haller | |
| 5,320,506 A | 6/1994 | Fogt | |
| 5,427,511 A | 6/1995 | Caillat et al. | |
| 5,451,148 A * | 9/1995 | Matsuzaki et al. | 418/55.1 |
| 5,582,312 A | 12/1996 | Niles et al. | |
| 5,819,794 A * | 10/1998 | Anderson | 137/543.17 |
| 5,884,665 A * | 3/1999 | Thurston et al. | 137/856 |
| 6,027,321 A * | 2/2000 | Shim et al. | 418/55.1 |
| 6,056,523 A * | 5/2000 | Won et al. | 418/55.1 |
| 6,109,899 A | 8/2000 | Barito et al. | |
| 6,227,830 B1 | 5/2001 | Fields et al. | |
| 6,379,133 B1 * | 4/2002 | Hahn et al. | 418/55.1 |
| 6,398,530 B1 | 6/2002 | Hasemann | |
| 6,439,867 B1 | 8/2002 | Clendenin | |
| 6,488,489 B2 | 12/2002 | Williams et al. | |
| 6,537,043 B1 * | 3/2003 | Chen | 418/55.1 |
| 6,682,327 B2 | 1/2004 | Milliff et al. | |
| 6,761,541 B1 | 7/2004 | Clendenin | |
| 6,814,551 B2 | 11/2004 | Kammhoff et al. | |

(Continued)

FOREIGN PATENT DOCUMENTS
JP   05272472 A   * 10/1993

*Primary Examiner* — Mary A Davis
(74) *Attorney, Agent, or Firm* — Reinhart Boerner Van Deuren P.C.

(57) ABSTRACT

A check valve is provided which may be integrated into a scroll compressor that prevents static cohesion sticking forces between a valve disc member and a retainer member of the check valve housing. Such static cohesion sticking forces may be particularly generated due to oil mist generation in such scroll compressors which create a thin lubricant film between the valve disc and the stop plate of the check valve housing, creating suction type static cohesion when dislodgment of the valve disc away from the stop plate is attempted. A relief region is created between the retainer and the valve disc creating a minimal contact surface area that greatly reduces and/or eliminates such static cohesion sticking forces. For example, the valve disc may be dished to have a concave surface that faces the retainer element provided by the stop plate.

26 Claims, 6 Drawing Sheets

U.S. PATENT DOCUMENTS

| | | |
|---|---|---|
| 6,960,070 B2 | 11/2005 | Kammhoff et al. |
| 7,112,046 B2 | 9/2006 | Kammhoff et al. |
| 7,186,099 B2 * | 3/2007 | Elson et al. .................. 418/55.6 |
| 7,600,533 B2 * | 10/2009 | Tai et al. .................. 137/533.19 |
| 7,878,775 B2 | 2/2011 | Duppert et al. |
| 7,878,780 B2 | 2/2011 | Bush et al. |
| 7,918,658 B2 | 4/2011 | Bush et al. |
| 7,963,753 B2 | 6/2011 | Bush |
| 7,967,581 B2 | 6/2011 | Beagle et al. |
| 7,993,117 B2 | 8/2011 | Bush |
| 7,997,877 B2 | 8/2011 | Beagle et al. |
| 8,133,043 B2 | 3/2012 | Duppert |
| 2005/0232800 A1 | 10/2005 | Kammhoff et al. |
| 2009/0185927 A1 | 7/2009 | Duppert et al. |
| 2009/0185929 A1 | 7/2009 | Duppert et al. |
| 2009/0185932 A1 | 7/2009 | Beagle et al. |
| 2010/0092320 A1 | 4/2010 | Duppert |

* cited by examiner

CONTOURED CHECK VALVE DISC AND SCROLL COMPRESSOR INCORPORATING SAME

FIELD OF THE INVENTION

The present invention relates to check valves and/or scroll compressors for compressing refrigerant and more particularly relates to the check valves for such scroll compressors.

BACKGROUND OF THE INVENTION

A scroll compressor is a certain type of compressor that is used to compress refrigerant for such applications as refrigeration, air conditioning, industrial cooling and freezer applications, and/or other applications where compressed fluid may be used. Such prior scroll compressors are known, for example, as exemplified in U.S. Pat. No. 6,398,530 to Hasemann; U.S. Pat. No. 6,814,551, to Kammhoff et al.; U.S. Pat. No. 6,960,070 to Kammhoff et al.; and U.S. Pat. No. 7,112,046 to Kammhoff et al., all of which are assigned to a Bitzer entity closely related to the present assignee. As the present disclosure pertains to improvements that can be implemented in these or other scroll compressor designs, the entire disclosures of U.S. Pat. Nos. 6,398,530; 7,112,046; 6,814,551; and 6,960,070 are hereby incorporated by reference in their entireties.

As is exemplified by these patents, scroll compressors conventionally include an outer housing having a scroll compressor contained therein. A scroll compressor includes first and second scroll compressor members. A first compressor member is typically arranged stationary and fixed in the outer housing. A second scroll compressor member is moveable relative to the first scroll compressor member in order to compress refrigerant between respective scroll ribs which rise above the respective bases and engage in one another. Conventionally the moveable scroll compressor member is driven about an orbital path about a central axis for the purposes of compressing refrigerant. An appropriate drive unit, typically an electric motor, is provided usually within the same housing to drive the movable scroll member.

The present invention pertains to improvements in the state of the art.

BRIEF SUMMARY OF THE INVENTION

The present invention is directed toward improvements in check valve structures such as valve structures utilized in scroll compressors such as U.S. Pat. No. 7,112,046 to Kammhoff et al. The Kammhoff '046 patent shows a check valve interposed between a high pressure chamber and the discharge port of scroll compressor bodies. More specifically, the present inventors have realized that due to the oil mist environment created in such scroll compressors that "stiction" is created. Stiction as used herein refers to a sticking suction force or static cohesion that can occur between the check valve disc and the corresponding stop plate of the check valve structure. For example, the oil mist environment allows sealing action between the flat geometry of these two structures such that the normal tendency of the check valve disc to release from this flat-to-flat contact is prevented by suction created when there is an attempt to move the check valve disc away from the corresponding stop plate. This can create the risk that high-pressure compressed refrigerant may reverse flow around the check valve disc through the peripheral ports and back through the check valve; this can reverse the relative movement between the scroll compressor bodies when the scroll compressor unit is shut off.

In accordance with the present invention, such static cohesion is prevented by means for preventing static cohesion sticking force between the valve disc and the retainer (e.g. as may be provided by a stop plate of such a check valve) for such a check valve in a scroll compressor apparatus. Such means includes a minimal surface contact that prevents stiction. Such a minimum contact may be created by a relief region formed along the contact interface between the retainer and the valve disc which may be provided by a recessed region on either or both of the structures, but preferably on the valve disc.

In accordance with one aspect of the present invention, a compressor apparatus for the compression of fluid comprises a housing and scroll compressors bodies in the housing that have respective bases and scroll ribs that project from the respective bases and in which mutually engage. Relative movement between the scroll compressor bodies compress fluid through a discharge port. A high pressure chamber in the housing is arranged to receive compressed fluid from the scroll compressor bodies. A check valve includes a check valve chamber interposed between the high pressure chamber in the housing and the discharge port of the scroll compressor bodies. The check valve includes a valve disc (also referred to as a valve plate) and a retainer (such as a stop plate) that retains the valve disc within the valve chamber. The valve disc is moveable between a valve seat in a closed position and the valve retainer in an open position. A means is provided for preventing a static cohesion sticking force between the valve disc and the retainer.

In accordance with the above aspect, the compressor apparatus may generate a mist of lubricant used for lubrication within the scroll compressor which may create a lubricant film on the valve disc or the retainer which would ordinarily create the static cohesion sticking force. The means to prevent such static cohesion sticking force may comprise less then complete contact interface between the valve disc and the retainer. More specifically, such means may include a relieved portion along the contact interface between the retainer and the valve disc. According to certain embodiments, the valve disc may be dished to include an outer annular contact ring located in a contact plane and in which the contact ring engages the retainer along a contact plane in the open position while the relieved region is formed into the valve disc such as a concave structure and is fully surrounded by the contact ring. This minimizes the contact interface between the valve disc and the retainer.

To provide the dishing or relieved region within the valve disc, there are a couple of possibilities. First, it is possible to employ a manufactured flat disc but of sufficiently thin and readily deformable material such that the design valve thickness and material will cause the valve disc to dish during initial operation under a compressed fluid pressure differential. Alternatively, the valve can also be pre-dished during initial formation such as when the valve plate is formed in a stamping operation. The valve disc may have a constant wall thickness; or alternatively, have a variable wall thickness created by the relieved region according to different embodiments.

Another inventive aspect is directed towards a check valve including a check valve housing having a check valve chamber extending between a retainer and a valve seat and in surrounding relation of a fluid port. The check valve also includes a valve disc that is retained by the retainer within the valve chamber. The valve disc is moveable between the valve seat in a closed position preventing back flow through the fluid port and the valve retainer in an open position permitting fluid flow through the fluid port and around the valve disc. A less than complete contact interface is provided between the valve disc and the retainer to prevent static cohesion sticking force between the valve disc and the retainer. Such a less than complete contact interface may be provided, for example, by a relieved portion that is provided along the contact interface between the retainer and the valve disc.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
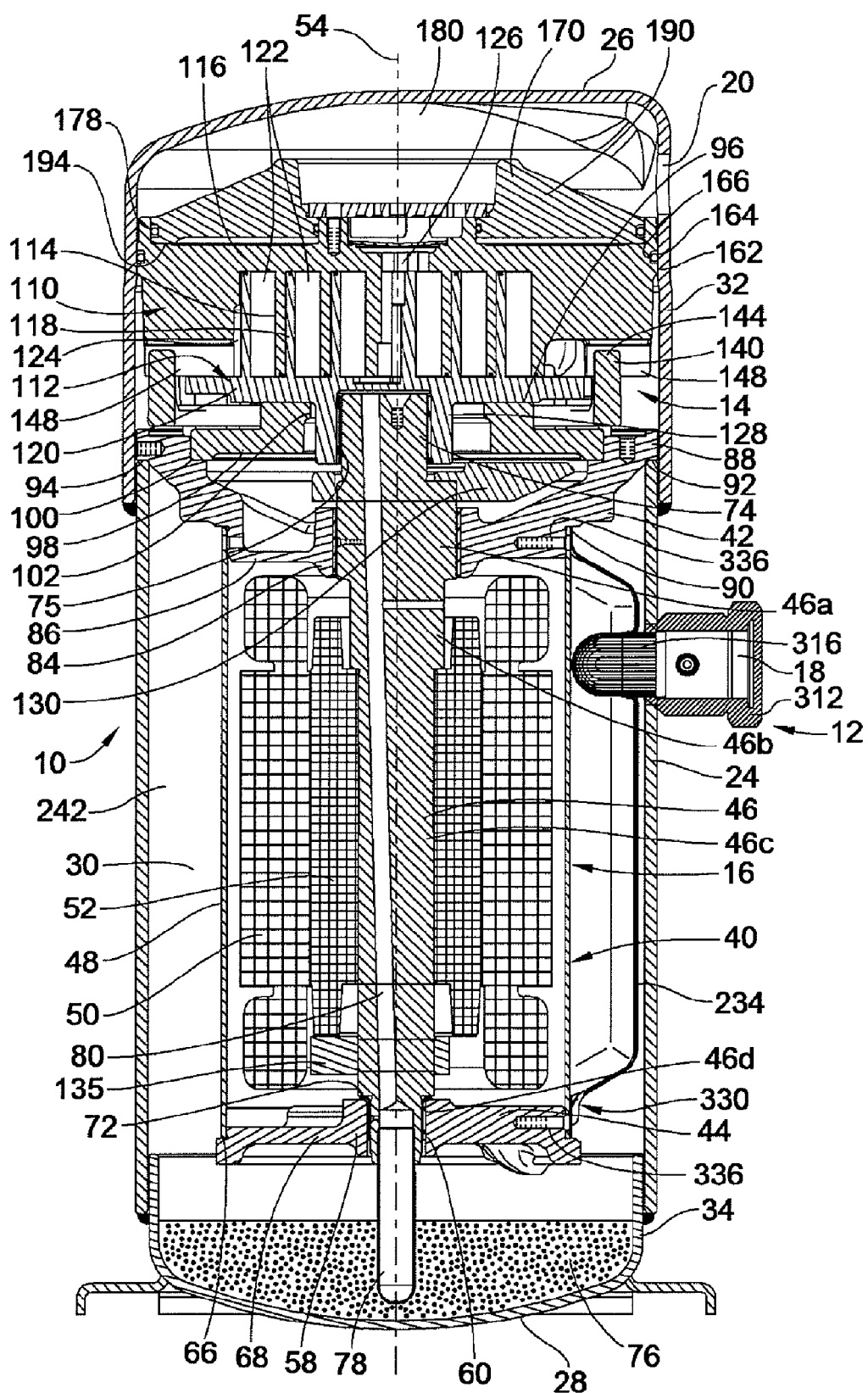
FIG. 1 is a cross section of a scroll compressor assembly in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An embodiment of the present invention is illustrated in the figures as a scroll compressor assembly 10 generally including an outer housing 12 in which a scroll compressor 14 can be driven by a drive unit 16. The scroll compressor assembly may be arranged in a refrigerant circuit for refrigeration, industrial cooling, freezing, air conditioning or other appropriate applications where compressed fluid is desired. Appropriate connection ports provide for connection to a refrigeration circuit and include a refrigerant inlet port 18 and a refrigerant outlet port 20 extending through the outer housing 12. The scroll compressor assembly 10 is operable through operation of the drive unit 16 to operate the scroll compressor 14 and thereby compress an appropriate refrigerant or other fluid that enters the refrigerant inlet port 18 and exits the refrigerant outlet port 20 in a compressed high pressure state.

The outer housing 12 may take many forms. In the preferred embodiment, the outer housing includes multiple shell sections and preferably three shell sections to include a central cylindrical housing section 24, a top end housing section 26 and a bottom end housing section 28. Preferably, the housing sections 24, 26, 28 are formed of appropriate sheet steel and welded together to make a permanent outer housing 12 enclosure. However, if disassembly of the housing is desired, other housing provisions can be made that can include metal castings or machined components.

The central housing section 24 is preferably cylindrical and telescopically interfits with the top and bottom end housing sections 26, 28. This forms an enclosed chamber 30 for housing the scroll compressor 14 and drive unit 16. Each of the top and bottom end housing sections 26, 28 are generally dome shaped and include respective cylindrical side wall regions 32, 34 to mate with the center section 24 and provide for closing off the top and bottom ends of the outer housing 12. As can be seen in FIG. 1, the top side wall region 32 telescopically overlaps the central housing section 24 and is exteriorly welded along a circular welded region to the top end of the central housing section 24. Similarly the bottom side wall region 34 of the bottom end housing section 28 telescopically interfits with the central housing section 24 (but is shown as being installed into the interior rather than the exterior of the central housing section 24) and is exteriorly welded by a circular weld region.

The drive unit 16 may preferably take the form of an electrical motor assembly 40, which is supported by upper and lower bearing members 42, 44. The motor assembly 40 operably rotates and drives a shaft 46. The electrical motor assembly 40 generally includes an outer annular motor housing 48, a stator 50 comprising electrical coils and a rotor 52 that is coupled to the drive shaft 46 for rotation together. Energizing the stator 50 is operative to rotatably drive the rotor 52 and thereby rotate the drive shaft 46 about a central axis 54.

Figure 4:
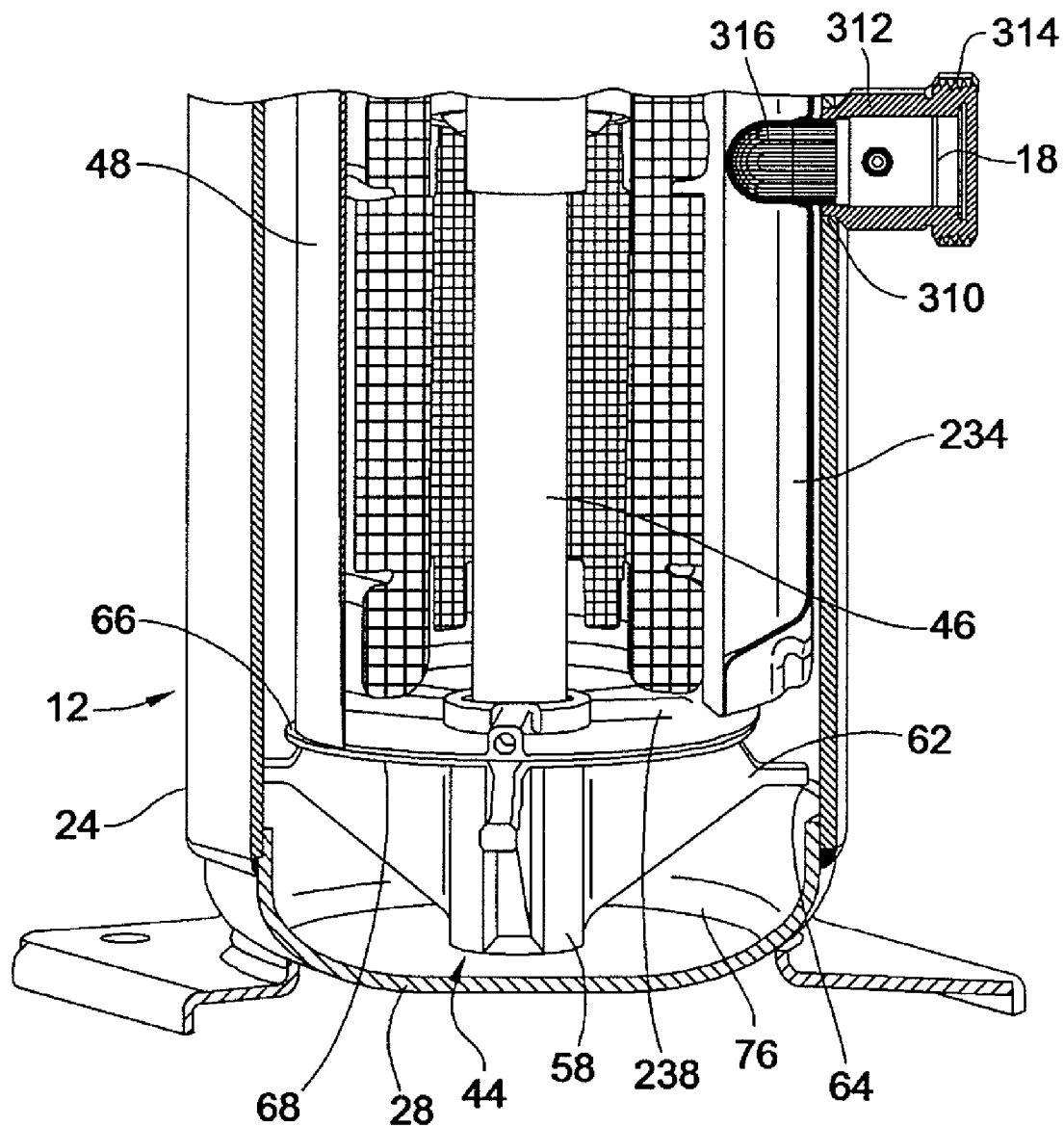
FIG. 4 is a partial cross section and cut-away view of a lower portion of the embodiment of FIG. 1.

With reference to FIGS. 1 and 4, the lower bearing member 44 includes a central generally cylindrical hub 58 that includes a central bushing and opening to provide a cylindrical bearing 60 to which the drive shaft 46 is journaled for rotational support. A plurality of arms 62 and typically at least three arms project radially outward from the bearing central hub 58 preferably at equally spaced angular intervals. These support arms 62 engage and are seated on a circular seating surface 64 provided by the terminating circular edge of the bottom side wall region 34 of the bottom outer housing section 28. As such, the bottom housing section 28 can serve to locate, support and seat the lower bearing member 44 and thereby serves as a base upon which the internal components of the scroll compressor assembly can be supported.

The lower bearing member 44 in turn supports the cylindrical motor housing 48 by virtue of a circular seat 66 formed on a plate-like ledge region 68 of the lower bearing member 44 that projects outward along the top of the central hub 58. The support arms 62 also preferably are closely toleranced relative to the inner diameter of the central housing section. The arms 62 may engage with the inner diameter surface of the central housing section 24 to centrally locate the lower bearing member 44 and thereby maintain position of the central axis 54. This can be by way of an interference and press-fit support arrangement between the lower bearing member 44 and the outer housing 12 (See e.g. FIG. 4). Alternatively according to a more preferred configuration, as shown in FIG. 1, the lower bearing engages with the lower housing section 28 which is in turn attached to center section 24. Likewise, the outer motor housing 48 may be supported with an interference and press-fit along the stepped seat 66 of the lower bearing member 44. As shown, screws may be used to securely fasten the motor housing to the lower bearing member 44.

The drive shaft 46 is formed with a plurality of progressively smaller diameter sections 46a-46d which are aligned concentric with the central axis 54. The smallest diameter section 46d is journaled for rotation within the lower bearing member 44 with the next smallest section 46c providing a step 72 for axial support of the drive shaft 46 upon the lower bearing member 44. The largest section 46a is journaled for rotation within the upper bearing member 42.

The drive shaft 46 further includes an offset eccentric drive section 74 that has a cylindrical drive surface 75 about an offset axis that is offset relative to the central axis 54. This offset drive section 74 is journaled within a cavity of the movable scroll member of the scroll compressor 14 to drive the movable member of the scroll compressor about an orbital path when the drive shaft 46 is spun about the central axis 54. To provide for lubrication of all of these bearing surfaces, the outer housing 12 provides an oil lubricant sump 76 at the bottom end in which suitable oil lubricant is provided. The drive shaft 46 has an oil lubricant pipe and impeller 78 that acts as an oil pump when the drive shaft is spun and thereby pumps oil out of the lubricant sump 76 into an internal lubricant passageway 80 defined within the drive shaft 46. During rotation of the drive shaft 46, centrifugal force acts to drive lubricant oil up through the lubricant passageway 80 against the action of gravity. The lubricant passageway 80 includes various radial passages as shown to feed oil through centrifugal force to appropriate bearing surfaces and thereby lubricate sliding surfaces as may be desired.

The upper bearing member 42 includes a central bearing hub 84 into which the largest section 46a of the drive shaft 46 is journaled for rotation. Extending outward from the bearing hub 84 is a support web 86 that merges into an outer peripheral support rim 88. Provided along the support web 86 is an annular stepped seating surface 90 which may have an interference and press-fit with the top end of the cylindrical motor housing 48 to thereby provide for axial and radial location. The motor housing 48 may also be fastened with screws to the upper bearing member 42. The outer peripheral support rim 88 also may include an outer annular stepped seating surface 92 which may have an interference and press-fit with the outer housing 12. For example, the outer peripheral rim 88 can engage the seating surface 92 axially, that is it engages on a lateral plane perpendicular to axis 54 and not through a diameter. To provide for centering there is provided a diametric fit just below the surface 92 between the central housing section 24 and the support rim 88. Specifically, between the telescoped central and top-end housing sections 24, 26 is defined in internal circular step 94, which is located axially and radially with the outer annular step 92 of the upper bearing member 42.

The upper bearing member 42 also provides axial thrust support to the movable scroll member through a bearing support via an axial thrust surface 96. While this may be integrally provided by a single unitary component, it is shown as being provided by a separate collar member 98 that is interfit with the upper portion of the upper bearing member 42 along stepped annular interface 100. The collar member 98 defines a central opening 102 that is a size large enough to provide for receipt of the eccentric offset drive section 74 and allow for orbital eccentric movement thereof that is provided within a receiving portion of the movable scroll compressor member 112.

Turning in greater detail to the scroll compressor 14, the scroll compressor body is provided by first and second scroll compressor bodies which preferably include a stationary fixed scroll compressor body 110 and a movable scroll compressor body 112. The moveable scroll compressor body 112 is arranged for orbital movement relative to the fixed scroll compressor body 110 for the purpose of compressing refrigerant. The fixed scroll compressor body includes a first rib 114 projecting axially from a plate-like base 116 and is designed in the form of a spiral. Similarly, the second movable scroll compressor body 112 includes a second scroll rib 118 projecting axially from a plate-like base 120 and is in the design form of a similar spiral. The scroll ribs 114, 118 engage in one another and abut sealingly on the respective base surfaces 120, 116 of the respectively other compressor body 112, 110. As a result, multiple compression chambers 122 are formed between the scroll ribs 114, 118 and the bases 120, 116 of the compressor bodies 112, 110. Within the chambers 122, progressive compression of refrigerant takes place. Refrigerant flows with an initial low pressure via an intake area 124 surrounding the scroll ribs 114, 118 in the outer radial region (see e.g. FIGS. 2-3). Following the progressive compression in the chambers 122 (as the chambers progressively are defined radially inward), the refrigerant exits via a compression outlet 126 which is defined centrally within the base 116 of the fixed scroll compressor body 110. Refrigerant that has been compressed to a high pressure can exit the chambers 122 via the compression outlet 126 during operation of the scroll compressor.

The movable scroll compressor body 112 engages the eccentric offset drive section 74 of the drive shaft 46. More specifically, the receiving portion of the movable scroll compressor body 112 includes a cylindrical bushing drive hub 128 which slideably receives the eccentric offset drive section 74 with a slideable bearing surface provided therein. In detail, the eccentric offset drive section 74 engages the cylindrical drive hub 128 in order to move the moveable scroll compressor body 112 about an orbital path about the central axis 54 during rotation of the drive shaft 46 about the central axis 54. Considering that this offset relationship causes a weight imbalance relative to the central axis 54, the assembly preferably includes a counter weight 130 that is mounted at a fixed angular orientation to the drive shaft 46. The counter weight 130 acts to offset the weight imbalance caused by the eccentric offset drive section 74 and the movable scroll compressor body 112 that is driven about an orbital path (e.g. among other things, the scroll rib is not equally balanced). The counter weight 130 includes an attachment collar 132 and an offset weight region 134 (see counter weight shown best in FIG. 2) that provides for the counter weight effect and thereby balancing of the overall weight of the rotating components about the central axis 54 in cooperation with a lower counterweight 135 for balancing purposes. This provides for reduced vibration and noise of the overall assembly by internally balancing or cancelling out inertial forces.

Figure 2:
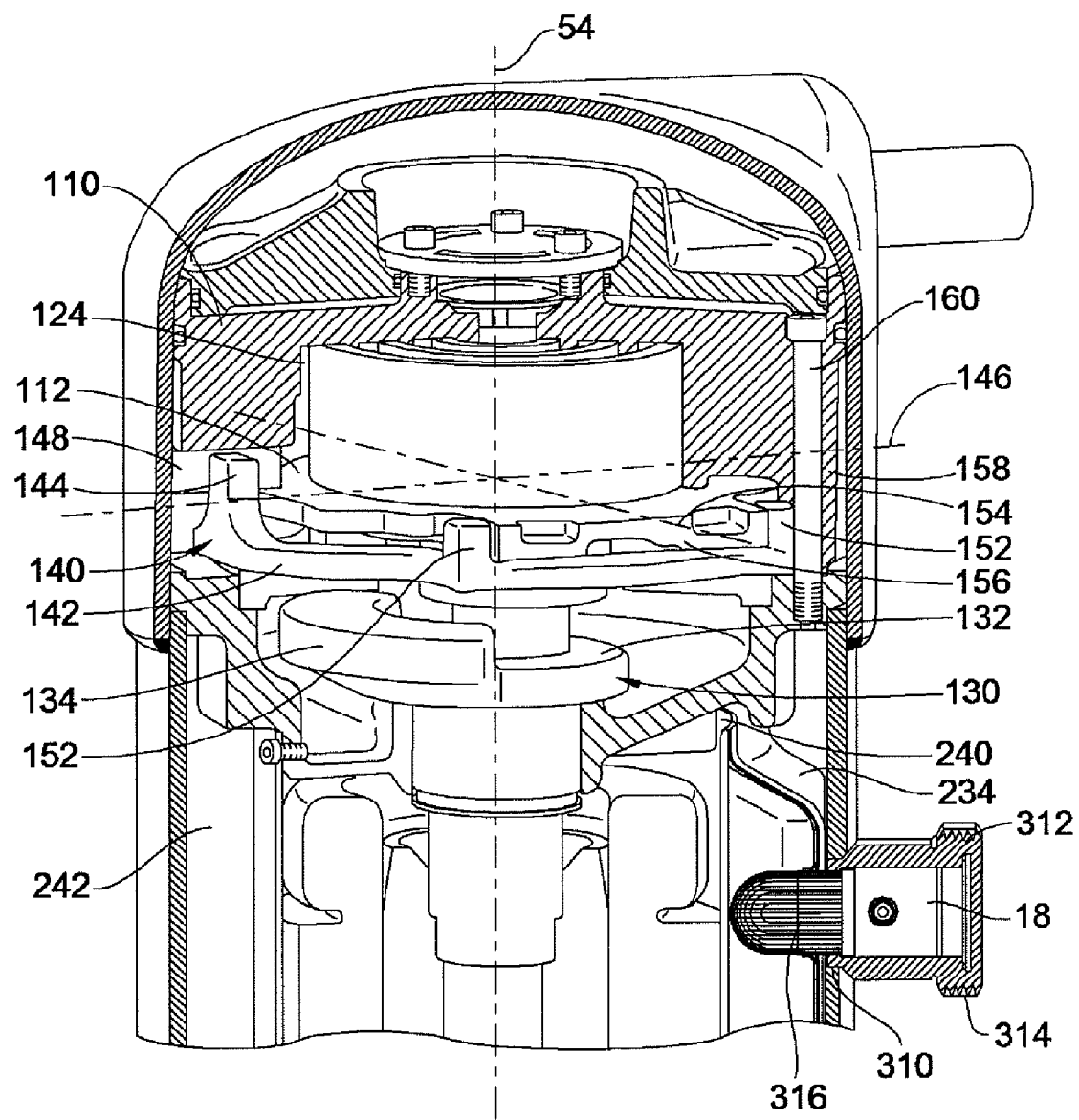
FIG. 2 is a partial cross section and cut-away view of an isometric drawing of an upper portion of the scroll compressor embodiment shown in FIG. 1.
Figure 3:
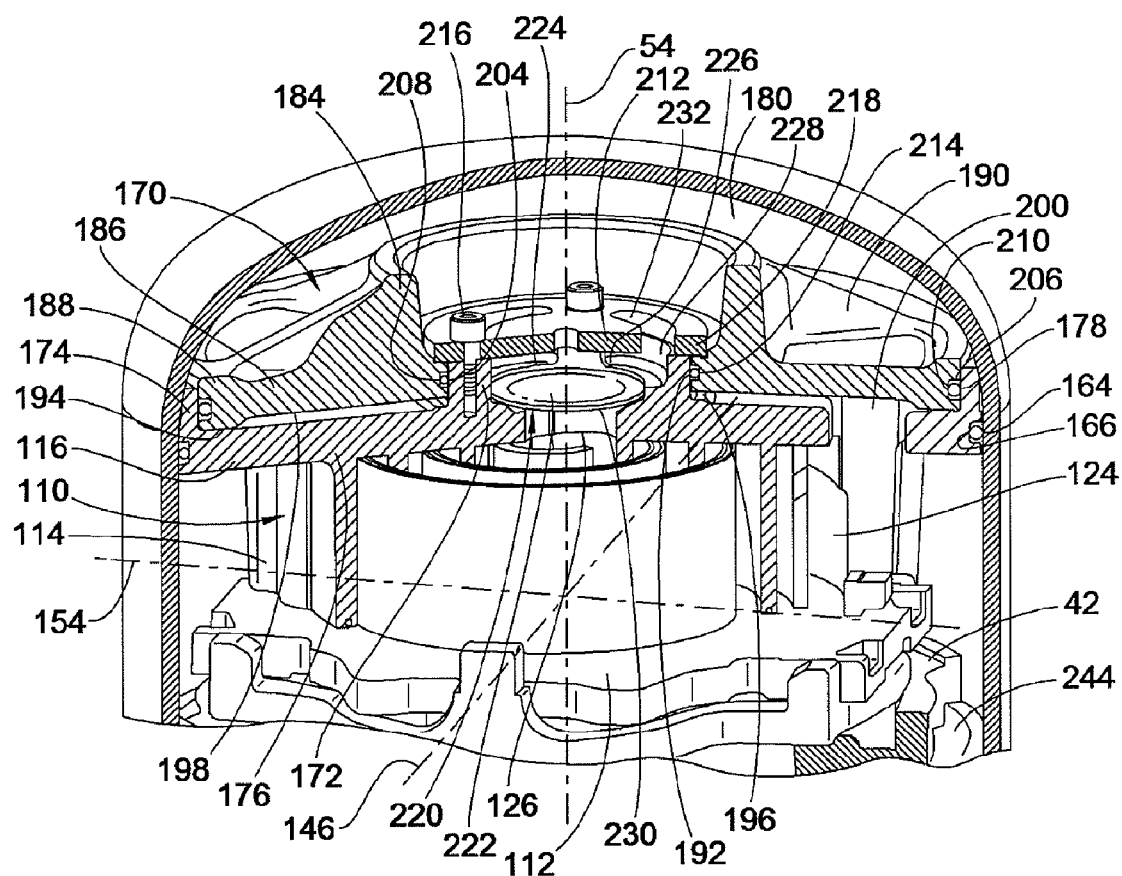
FIG. 3 is a similar view to FIG. 2 but enlarged and taken about a different angle and section in order to show other structural features.

With reference to FIGS. 1-3, and particularly FIG. 2, the guiding movement of the scroll compressor can be seen. To guide the orbital movement of the movable scroll compressor body 112 relative to the fixed scroll compressor body 110, an appropriate key coupling 140 may be provided. Keyed couplings are often referred to in the scroll compressor art as an "Oldham Coupling." In this embodiment, the key coupling 140 includes an outer ring body 142 and includes two first keys 144 that are linearly spaced along a first lateral axis 146 and that slide closely and linearly within two respective keyway tracks 148 that are linearly spaced and aligned along the first axis 146 as well. The key way tracks 148 are defined by the stationary fixed scroll compressor body 110 such that the linear movement of the key coupling 140 along the first lateral axis 146 is a linear movement relative to the outer housing 12 and perpendicular to the central axis 54. The keys can comprise slots, grooves or, as shown, projections which project from the ring body 142 of the key coupling 140. This control of movement over the first lateral axis 146 guides part of the overall orbital path of the moveable scroll compressor body 112.

Additionally, the key coupling includes four second keys 152 in which opposed pairs of the second keys 152 are linearly aligned substantially parallel relative to a second traverse lateral axis 154 that is perpendicular to the first lateral axis 146. There are two sets of the second keys 152 that act cooperatively to receive projecting sliding guide portions 156 that project from the base 120 on opposite sides of the movable scroll compressor body 112. The guide portions 156 linearly engage and are guided for linear movement along the second traverse lateral axis by virtue of sliding linear guiding movement of the guide portions 156 along sets of the second keys 152.

By virtue of the key coupling 140, the moveable scroll compressor body 112 has movement restrained relative to the fixed scroll compressor body 110 along the first lateral axis 146 and second traverse lateral axis 154. This results in the prevention of any relative rotation of the moveable scroll body as it allows only translational motion. More particularly, the fixed scroll compressor body 110 limits motion of the key coupling 140 to linear movement along the first lateral axis 146; and in turn, the key coupling 140 when moving along the first lateral axis 146 carries the moveable scroll 112 along the first lateral axis 146 therewith. Additionally, the movable scroll compressor body can independently move relative to the key coupling 140 along the second traverse lateral axis 154 by virtue of relative sliding movement afforded by the guide portions 156 which are received and slide between the second keys 152. By allowing for simultaneous movement in two mutually perpendicular axes 146, 154, the eccentric motion that is afforded by the eccentric offset drive section 74 of the drive shaft 46 upon the cylindrical drive hub 128 of the movable scroll compressor body 112 is translated into an orbital path movement of the movable scroll compressor body 112 relative to the fixed scroll compressor body 110.

Referring in greater detail to the fixed scroll compressor body 110, this body 110 is fixed to the upper bearing member 42 by an extension extending axially and vertically therebetween and around the outside of the moveable scroll compressor body 112. In the illustrated embodiment, the fixed scroll compressor body 110 includes a plurality of axially projecting legs 158 (see FIG. 2) projecting on the same side as the scroll rib from the base 116. These legs 158 engage and are seated against the top side of the upper bearing member 42. Preferably, bolts 160 (FIG. 2) are provided to fasten the fixed scroll compressor body 110 to the upper bearing member 42. The bolts 160 extend axially through the legs 158 of the fixed scroll compressor body and are fastened and screwed into corresponding threaded openings in the upper bearing member 42. For further support and fixation of the fixed scroll compressor body 110, the outer periphery of the fixed scroll compressor body includes a cylindrical surface 162 that is closely received against the inner cylindrical surface of the outer housing 10 and more particularly the top end housing section 26. A clearance gap between surface 162 and side wall 32 serves to permit assembly of upper housing 26 over the compressor assembly and subsequently to contain the o-ring seal 164. An O-ring seal 164 seals the region between the cylindrical locating surface 162 and the outer housing 112 to prevent a leak path from compressed high pressure fluid to the un-compressed section/sump region inside of the outer housing 12. The seal 164 can be retained in a radially outward facing annular groove 166.

With reference to FIGS. 1-3 and particularly FIG. 3, the upper side (e.g. the side opposite the scroll rib) of the fixed scroll 110 supports a floatable baffle member 170. To accommodate the same, the upper side of the fixed scroll compressor body 110 includes an annular and more specifically cylindrical inner hub region 172 and an outwardly spaced peripheral rim 174 which are connected by radially extending disc region 176 of the base 116. Between the hub 172 and the rim 174 is provided an annular piston-like chamber 178 into which the baffle member 170 is received. With this arrangement, the combination of the baffle member 170 and the fixed scroll compressor body 110 serve to separate a high pressure chamber 180 from lower pressure regions within the housing 10. While the baffle member 170 is shown as engaging and constrained radially within the outer peripheral rim 174 of the fixed scroll compressor body 110, the baffle member 170 could alternatively be cylindrically located against the inner surface of the outer housing 12 directly.

As shown in the embodiment, and with particular reference to FIG. 3, the baffle member 170 includes an inner hub region 184, a disc region 186 and an outer peripheral rim region 188. To provide strengthening, a plurality of radially extending ribs 190 extending along the top side of the disc region 186 between the hub region 184 and the peripheral rim region 188 may be integrally provided and are preferably equally angularly spaced relative to the central axis 54. The baffle member 170 in addition to tending to separate the high pressure chamber 180 from the remainder of the outer housing 12 also serves to transfer pressure loads generated by high pressure chamber 180 away from the inner region of the fixed scroll compressor body 110 and toward the outer peripheral region of the fixed scroll compressor body 110. At the outer peripheral region, pressure loads can be transferred to and carried more directly by the outer housing 12 and therefore avoid or at least minimize stressing components and substantially avoid deformation or deflection in working components such as the scroll bodies. Preferably, the baffle member 170 is floatable relative to the fixed scroll compressor body 110 along the inner peripheral region. This can be accomplished, for example, as shown in the illustrated embodiment by a sliding cylindrical interface 192 between mutually cylindrical sliding surfaces of the fixed scroll compressor body and the baffle member along the respective hub regions thereof. As compressed high pressure refrigerant in the high pressure chamber 180 acts upon the baffle member 170, substantially no load may be transferred along the inner region, other than as may be due to frictional engagement. Instead, an axial contact interface ring 194 is provided at the radial outer periphery where the respective rim regions are located for the fixed scroll compressor body 110 and the baffle member 170. Preferably, an annular axial gap 196 is provided between the innermost diameter of the baffle member 170 and the upper side of the fixed scroll compressor body 110. The annular axial gap 196 is defined between the radially innermost portion of the baffle member and the scroll member and is adapted to decrease in size in response to a pressure load caused by high pressure refrigerant compressed within the high pressure chamber 180. The gap 196 is allowed to expand to its relaxed size upon relief of the pressure and load.

To facilitate load transfer most effectively, an annular intermediate or lower pressure chamber 198 is defined between the baffle member 170 and the fixed scroll compressor body 110. This intermediate or lower pressure chamber can be subject to either the lower sump pressure as shown, or can be subject to an intermediate pressure (e.g. through a fluid communication passage 200 defined through the fixed scroll compressor body to connect one of the individual compression chambers 122 to the chamber 198). Load carrying characteristics can therefore be configured based on the lower or intermediate pressure that is selected for best stress/deflection management. In either event, the pressure contained in the intermediate or low pressure chamber 198 during operation is substantially less than the high pressure chamber 180 thereby causing a pressure differential and load to develop across the baffle member 170.

To prevent leakage and to better facilitate load transfer, inner and outer seals 204, 206 may be provided, both of which may be resilient, elastomeric O-ring seal members. The inner seal 204 is preferably a radial seal and disposed in a radially inwardly facing inner groove 208 defined along the inner diameter of the baffle member 170. Similarly the outer seal 206 can be disposed in a radially outwardly facing outer groove 210 defined along the outer diameter of the baffle member 170 in the peripheral rim region 188. While a radial seal is shown at the outer region, alternatively or in addition an axial seal may be provided along the axial contact interface ring 194.

While the baffle member 170 could be a stamped steel component, preferably and as illustrated, the baffle member 170 comprises a cast and/or machined member (and may be aluminum) to provide for the expanded ability to have several structural features as discussed above. By virtue of making the baffle member in this manner, heavy stamping of such baffles can be avoided.

Additionally, the baffle member 170 can be retained to the fixed scroll compressor body 110. Specifically, as can be seen in the figures, a radially inward projecting annular flange 214 of the inner hub region 184 of the baffle member 170 is trapped axially between the stop plate 212 and the fixed scroll compressor body 110. The stop plate 212 is mounted with bolts 216 to a fixed scroll compressor body 210. The stop plate 212 includes an outer ledge 218 that projects radially over the inner hub 172 of the fixed scroll compressor body 110. The stop plate ledge 218 serves as a stop and retainer for the baffle member 170. In this manner, the stop plate 212 serves to retain the baffle member 170 to the fixed scroll compressor body 110 such that the baffle member 170 is carried thereby.

As shown, the stop plate 212 can be part of a check valve 220. The check valve includes a moveable valve plate element 222 contained within a chamber defined in the outlet area of the fixed scroll compressor body within the inner hub 172. The stop plate 212 thus closes off a check valve chamber 224 in which the moveable valve plate element 222 is located. Within the check valve chamber there is provided a cylindrical guide wall surface 226 that guides the movement of the check valve 220 along the central axis 54. Recesses 228 are provided in the upper section of the guide wall 226 to allow for compressed refrigerant to pass through the check valve when the moveable valve plate element 222 is lifted off of the valve seat 230. Openings 232 are provided in the stop plate 212 to facilitate passage of compressed gas from the scroll compressor into the high pressure chamber 180. The check valve is operable to allow for one way directional flow such that when the scroll compressor is operating, compressed refrigerant is allowed to leave the scroll compressor bodies through the compression outlet 126 by virtue of the valve plate element 222 being driven off of its valve seat 230. However, once the drive unit shuts down and the scroll compressor is no longer operating, high pressure contained within the high pressure chamber 180 forces the movable valve plate element 222 back upon the valve seat 230. This closes off check valve 220 and thereby prevents backflow of compressed refrigerant back through the scroll compressor.

During operation, the scroll compressor assembly 10 is operable to receive low pressure refrigerant at the housing inlet port 18 and compress the refrigerant for delivery to the high pressure chamber 180 where it can be output through the housing outlet port 20. As is shown, in FIGS. 1 and 4, a suction duct 234 is connected internally of the housing 12 to guide the lower pressure refrigerant from the inlet port 18 into housing and beneath the motor housing. This allows the low pressure refrigerant to flow through and across the motor and thereby cool and carry heat away from the motor which can be caused by operation of the motor. Low pressure refrigerant can then pass longitudinally through the motor housing and around through void spaces therein toward the top end where it can exit through a plurality of motor housing outlets 240 (see FIG. 2) that are equally angularly spaced about the central axis 54. The motor housing outlets 240 may be defined either in the motor housing 48, the upper bearing member 42 or by a combination of the motor housing and upper bearing member (e.g. by gaps formed therebetween as shown in FIG. 2). Upon exiting the motor housing outlet 240, the low pressure refrigerant enters an annular chamber 242 formed between the motor housing and the outer housing. From there, the low pressure refrigerant can pass through the upper bearing member through a pair of opposed outer peripheral through ports 244 that are defined by recesses on opposed sides of the upper bearing member 42 to create gaps between the bearing member 42 and housing 12 as shown in FIG. 3 (or alternatively holes in bearing member 42). The through ports 244 may be angularly spaced relative to the motor housing outlets 240. Upon passing through the upper bearing member 42, the low pressure refrigerant finally enters the intake area 124 of the scroll compressor bodies 110, 112. From the intake area 124, the lower pressure refrigerant finally enters the scroll ribs 114, 118 on opposite sides (one intake on each side of the fixed scroll compressor body) and is progressively compressed through chambers 122 to where it reaches it maximum compressed state at the compression outlet 126 where it subsequently passes through the check valve 220 and into the high pressure chamber 180. From there, high pressure compressed refrigerant may then pass from the scroll compressor assembly 10 through the refrigerant housing outlet port 20.

Referring to FIGS. 1-4, it is seen that a suction duct 234 is preferably employed to direct incoming fluid flow (e.g. refrigerant) through the housing inlet 18. To provide for the inlet 18, the housing includes an inlet opening 310 in which an inlet fitting 312 is provided that includes a connector such as threads 314 or other such connection means such as a barb or quick connect coupler, for example. The inlet fitting 312 is welded to the housing shell in engagement with the inlet opening 310. The inlet opening 310 and the inlet fitting 312 are thereby provided for communicating the refrigerant into the housing.

Additionally, a suction screen 316 is provided to form a common bridge and thereby communicate refrigerant from the inlet 18 through the entrance opening and port 318 formed in the suction duct 234. Substantially all (in other words—all or most) of the incoming refrigerant is thereby directed through the suction screen where metal shavings or other particulates can be screened out by an integral screen provided by the suction screen 316. Once passing through the screen, refrigerant is then directed by the suction duct 234 to a location upstream and at the entrance of the motor housing.

Figure 5:
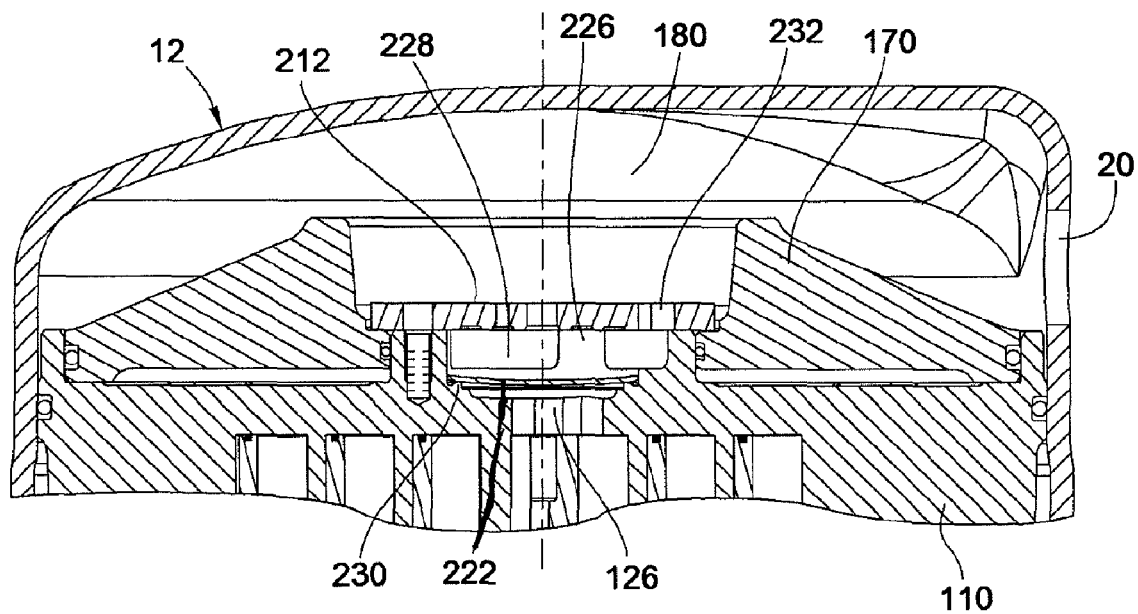
FIG. 5 is an enlarged cross sectional view of the check valve region illustrating a check valve disc in accordance with an embodiment of the present invention.

Turning in greater detail to the check valve structure which is incorporated into the top portion of the scroll compressor as shown in the enlarged view of FIG. 5, an improvement in the valve plate element 222 which is in the form of a valve disc is illustrated. Specifically, this valve disc element is dished to prevent static cohesion sticking force between the valve disc and the check valve retainer, which can be provided by the stop plate 212. Such a static cohesion sticking force (also referred to herein as stiction) between the valve disc and the retainer may be created in part due to the generation of lubricant mist used for lubrication oil coming from the oil sump 76. While the lubricant provides an important lubrication function in the scroll compressor thereby providing for longevity, the mist created also tends to create a lubricant film on the valve element 222 and/or the stop plate 212 such that when these two structures are in surface-to-surface contact, a suction effect tends to be created when relative axial displacement between these two structures is attempted. This can prevent and/or increase the time required for the check valve to shut and thereby close the discharge port and fluid port provided by the compression outlet 126 of the scroll compressor bodies. If left open, the check valve would allow compressed fluid to flow back through the scroll compressor bodies and causing it to run in reverse at least temporarily.

To remedy this issue, embodiments herein disclose minimum contact that may be provided by a relieved region between the stop plate 212 and the plate element 222.

Figure 7:
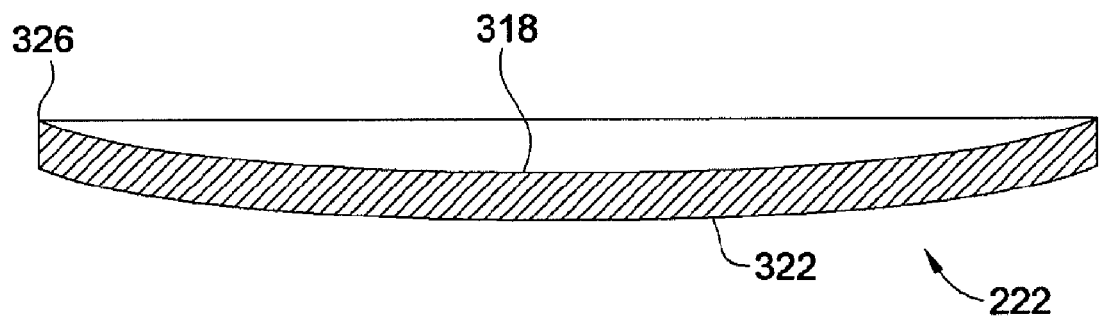
FIG. 7 is an enlarged cross section of check valve disc employed in the embodiment of FIG. 5.
Figure 8:
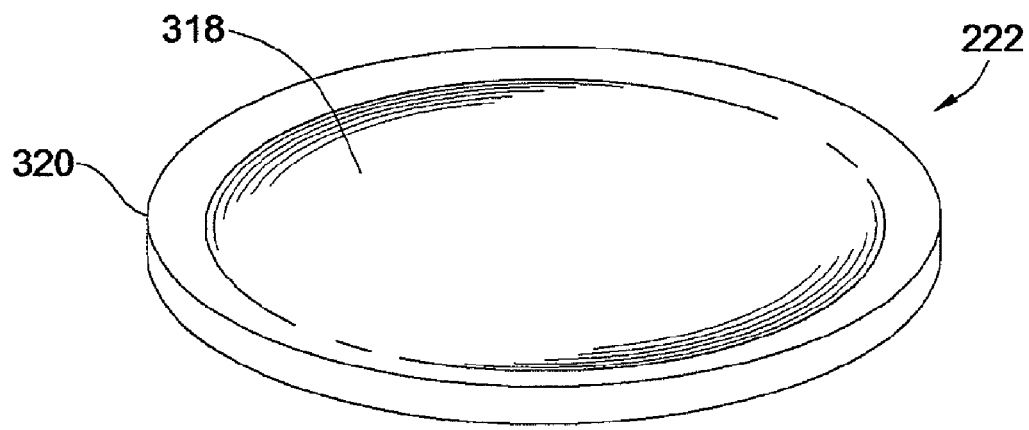
FIG. 8 is a perspective view of the check valve disc shown in FIG. 7.

Preferably and according to embodiments herein, the valve disc and plate element 222 includes a relieved region generally indicated at 318 that faces the stop plate 212. Preferably, the valve plate element 222 includes an outer annular contact ring 320 that is located in a contact plane in which the contact ring engages the stop plate 212 along a circular contact (along the contact plane) when the check valve is in the open position. As shown, the relieved region 318 may be fully surrounded by the contact ring 320 and may take the form of a concave dished region formed into the valve disc on one side with a corresponding convex region 322 that is formed on a side opposite as shown in the embodiment of FIGS. 5, 7 and 8. As a result, the valve disc may have a constant wall thickness.

Such a dished and constant wall thickness valve element may be provided by a couple different methodologies. First, this valve element may be pre-dished during a stamping operation to form the concave and convex regions during the original manufacture of the valve disc. Alternatively, the valve element may originally be flat and of a sufficiently thinned thickness and a material such that the valve will "dish" during initial operation under a maximum pressure differential generated during initial operation of the scroll compressor. For example, according to one embodiment, the valve element may be stamped formed as a flat plate with a thickness of about two millimeters and a material of or comparable to carbon steel AISI 4140 material. It is anticipated that this type of structure will dish during operation thereby creating the relieved portion in the valve disc that faces the retainer provided by stop plate 212. As illustrated in FIGS. 7 and 8, the circular contact ring 320 may be simply provided by a circular contact edge 326.

Figure 6:
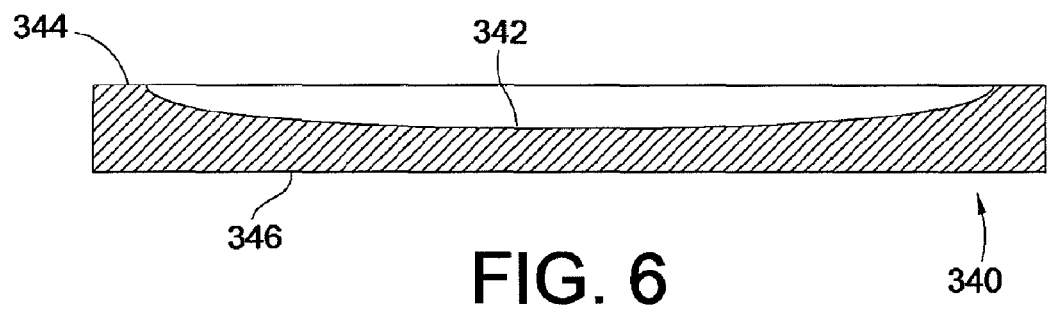
FIG. 6 is a cross section of an alternative embodiment of a check valve disc to that employed in FIG. 5.

Alternatively and referring to FIG. 6, it is also possible to remove material from the contact interface such as directly from a central region of a valve disc 340 as shown in the alternative embodiment of FIG. 6. According to this embodiment, the valve disc 340 also includes a relieved region such as a concave region 342 and a circular contact ring 344. However, in this embodiment, there is not a constant valve wall thickness but instead a variable thickness due to the fact that the other side of the valve disc is a flat face 346. Additionally, it is also contemplated that a relieved region may also be formed on the stop plate along the contact interface as a further alternative in combination or as an alternative to the concave relieved region formed on the valve disc. As shown in this embodiment, the circular contact ring 344 may actually occupy some area and is not simply restricted to a true circular edge necessarily.

In operation, the relieved region provides less then complete contact interface between the valve disc and plate element and the valve retainer that is provided by stop plate 212. As a result, when oil film is generated along the contact interface therebetween, the static cohesion sticking force is substantially reduced and/or eliminated such that gravity and/or refrigerant pressure that dislodges the valve disc and plate element away from the stop plate is not impeded by substantial static cohesion sticking forces. As a result, this prevents and/or eliminates the likelihood that compressed refrigerant will back feed through the scroll compressor bodies and run these bodies temporarily in reverse due to the check valve sticking open from such static cohesion sticking forces.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A compressor apparatus for compression of fluid, comprising:
   a housing;
   scroll compressor bodies in the housing including a first scroll body and a second scroll body, the first and second scroll bodies having respective bases and respective scroll ribs that project from the respective bases and which mutually engage, the second scroll body being moveable relative to the first scroll for compressing fluid through a discharge port;

a high pressure chamber in the housing arranged to receive compressed fluid from the scroll compressor bodies; and a check valve having a check valve chamber interposed between the high pressure chamber and the discharge port, the check valve including a valve disc and a retainer retaining the valve disc in the valve chamber, the valve disc movable between a valve seat in a closed position and the valve retainer in an open position, and wherein the valve disc comprises a curved member having an edge that creates a circular contact with the retainer and includes a relieved portion facing the retainer.

2. The compressor apparatus of claim 1, wherein the curved member of the valve disc includes an outer annular contact ring located in a contact plane, the contact ring engaging the retainer along the contact plane in the open position.

3. The compressor apparatus of claim 2, wherein the relieved region is fully surrounded by the contact ring and wherein the relieved region is a concave dished region formed into the valve disc on one side and a corresponding convex region formed on a side opposite said one side, and wherein the valve disc has a constant wall thickness.

4. The compressor apparatus of claim 1, wherein the valve disc is formed into the single continuously-curved member by an initial operation of the compressor apparatus in which a pressure differential dishes the valve disc into a curved state thereby forming the relieved portion, the valve disc having a constant thickness and being sufficiently soft relative to the pressure differential to facilitate said dishing.

5. The compressor apparatus of claim 1, wherein the compressor apparatus generates mist of lubricant used for lubrication, the mist creating a lubricant film on the valve disc or the retainer, and wherein the relieved portion is adapted to prevent stiction between the valve disc and the retainer resulting from said lubricant film.

6. The compressor apparatus of claim 1, further comprising a baffle at least partially forming a partition between the scroll compressor bodies and the high pressure chamber, one of the scroll bodies defining a central recess to integrally provide a check valve housing and valve chamber over the discharge port, wherein the retainer is a stop plate mounted to said one of the scroll bodies.

7. The compressor apparatus of claim 6, wherein the central recess includes a generally cylindrical wall extending from the valve seat interrupted by axially extending grooves providing flow channels around the valve disc in the open position.

8. The compressor apparatus of claim 1, wherein the relieved portion formed in the valve disc, which is axially-aligned with a flat portion of the retainer, is such that flat-surface-to-flat-surface contact between the relieved portion and the flat portion is avoided when the valve disc is engaged with the retainer in the open position.

9. The compressor apparatus of claim 1, wherein the valve disc is curved at the interface between the valve disc and the valve seat.

10. A compressor apparatus for compression of fluid, comprising:

a housing;

scroll compressor bodies in the housing including a first scroll body and a second scroll body, the first and second scroll bodies having respective bases and respective scroll ribs that project from the respective bases and which mutually engage, the second scroll body being moveable relative to the first scroll for compressing fluid through a discharge port;

a high pressure chamber in the housing arranged to receive compressed fluid from the scroll compressor bodies; and a check valve having a check valve chamber interposed between the high pressure chamber and the discharge port, the check valve including a valve disc and a retainer retaining the valve disc in the valve chamber, the valve disc movable between a valve seat in a closed position and the valve retainer in an open position;

means for preventing a static cohesion sticking force between the valve disc and the retainer, wherein the means for preventing a static cohesion sticking force include a recess formed in the valve disc aligned axially with a flat portion of the retainer such that flat-surface-to-flat-surface contact between the recess and the flat portion is avoided when the valve disc is engaged with the retainer in the open position; and wherein the valve disc comprises a curved member having an edge that creates a circular contact with the retainer.

11. The compressor apparatus of claim 10, wherein the compressor apparatus generates mist of lubricant used for lubrication, the mist creating an lubricant film on the valve disc or the retainer which creates the static cohesion sticking force.

12. The compressor apparatus of claim 10, wherein the means comprises less than complete contact interface between the valve disc and the retainer.

13. The compressor apparatus of claim 12, wherein the means includes a relieved portion along the contact interface between the retainer and the valve disc.

14. The compressor apparatus of claim 13, wherein the curved member of the valve disc includes an outer annular contact ring located in a contact plane, the contact ring engaging the retainer along the contact plane in the open position wherein the relieved region is formed into the valve disc and is fully surrounded by the contact ring.

15. The compressor apparatus of claim 10, further comprising a baffle at least partially forming a partition between the scroll compressor bodies and the high pressure chamber, one of the scroll bodies defining a central recess to integrally provide a check valve housing and valve chamber over the discharge port, wherein the retainer is a stop plate mounted to said one of the scroll bodies, wherein the central recess includes a generally cylindrical wall extending from the valve seat interrupted by axially extending grooves providing flow channels around the valve disc in the open position.

16. The compressor apparatus of claim 15, wherein the compressor apparatus generates mist of lubricant used for lubrication, the mist creating an lubricant film on the valve disc or the retainer which creates the static cohesion sticking force, wherein the means comprises less than complete contact interface between the valve disc and the retainer, and wherein the means includes a relieved portion along the contact interface between the valve disc and the retainer.

17. The compressor apparatus of claim 10, wherein the means for preventing static cohesion sticking force comprises the curved member of the valve disc with an outer contact edge that interfaces with the retainer.

18. The compressor apparatus of claim 17, wherein the valve disc has a constant thickness.

19. The compressor apparatus of claim 10, wherein the means for preventing static cohesion sticking force comprises the curved member of the valve disc of constant thickness with a contact interface between the valve disc and the valve seat.

20. A check valve, comprising:
- a check valve housing having a check valve chamber extending between a retainer and a valve seat surrounding a fluid port;
- a valve disc having a curved form with an edge that creates a circular contact with the retainer, the retainer retaining the valve disc in the valve chamber, the valve disc movable between the valve seat in a closed position preventing back flow through the fluid port and the valve retainer in an open position permitting fluid flow through the fluid port and around the valve disc; and
- wherein a less than complete contact interface is provided between the valve disc and the retainer to prevent a static cohesion sticking force between the valve disc and the retainer.

21. The check valve of claim 20, wherein a relieved portion is provided along the contact interface between the retainer and the valve disc.

22. The check valve of claim 21, wherein the curved form of the valve disc includes an outer annular contact ring located in a contact plane, the contact ring engaging the retainer along the contact plane in the open position wherein the relieved region is formed into the valve disc and is fully surrounded by the contact ring.

23. The check valve of claim 22, wherein the relieved region is a concave dished region formed into the valve disc, and wherein the valve disc has a convex face on a side opposite of the relieved region, wherein the valve disc has a constant wall thickness between the concave dished region and the convex face.

24. The check valve of claim 21, wherein the valve chamber include a generally cylindrical wall extending between the valve seat and the retainer with axial flow passages formed into the cylindrical wall to provide for flow around the valve disc in the open position, wherein a lubricant film on the valve disc or the retainer tends to create static cohesion therebetween, and wherein the relieved portion is adapted to prevent such static cohesion between the valve disc and the retainer resulting from said lubricant film.

25. The check valve of claim 20, wherein a relieved portion is formed in the valve disc, which is axially-aligned with a flat portion of the retainer such that flat-surface-to-flat-surface contact between the relieved portion and the flat portion is avoided when the valve disc is engaged with the retainer in the open position.

26. The compressor apparatus of claim 20, wherein the valve disc is curved at the interface between the valve disc and the valve seat.

* * * * *